Figure 1:
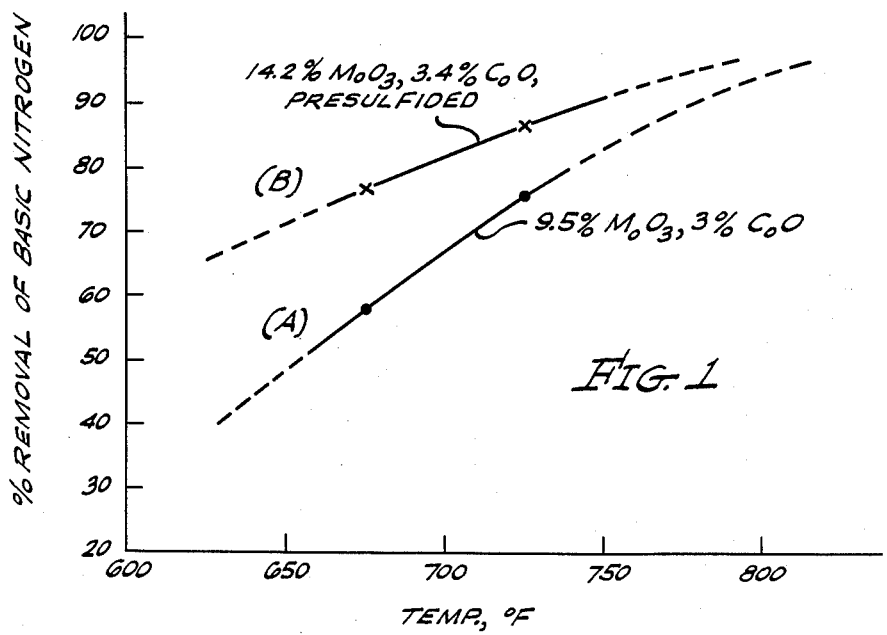

(C) = PRESULFIDED CATALYSTS
(D) = FEED-SULFIDED CATALYSTS
(E) = PARTIALLY FEED-SULFIDED CATALYSTS

INVENTOR.
RYDEN L. RICHARDSON
BY
AGENT

United States Patent Office 3,094,480
Patented June 18, 1963

3,094,480
HYDRODENITROGENATION WITH HIGH MOLYBDENUM CONTENT CATALYST
Ryden L. Richardson, Fullerton, Calif., assignor to Union Oil Company of California, Los Angeles, Calif., a corporation of California
Filed Oct. 31, 1960, Ser. No. 65,987
3 Claims. (Cl. 208—254)

This invention relates to the catalytic hydrorefining of hydrocarbons to effect a general purifying and/or upgrading thereof, as by desulfurization, denitrogenation, hydrogenation of diolefins, color improvement and the like. More specifically, the invention is concerned mainly with denitrogenation. In broad aspect the process consists in contacting the feed material under hydrorefining conditions with a catalyst which comprises as its essential active ingredients certain critical proportions of cobalt and molybdenum in a pre-sulfided state. More specifically, said catalyst must contain between about 0.7% and 4% by weight of cobalt, and between about 7.5% and 12% by weight of molybdenum, calculated as free metals, the entire composition, however, having been pre-sulfided under non-coking conditions prior to use in the hydrorefining process. Prior to the pre-sulfiding operation, the active metals are distended, as by impregnation, upon a carrier having an extended surface area such as activated alumina, or preferably activated alumina containing a minor proportion of coprecipitated silica.

As disclosed in my prior copending application, Serial No. 788,421, filed January 22, 1959, now abandoned (of which this application is a continuation-in-part), the denitrogenation activity of cobalt oxide-molybdenum oxide catalysts is materially improved by raising the $MoO_3$ content from the conventional 5–10% range to the 11–18% range, and preferably to about 12.5–15%. For example, a catalyst containing 4% CoO and 15% $MoO_3$ (supported on activated alumina) displays a denitrogenation activity about 1.37 times that of a similar composition containing only 9% $MoO_3$, after both catalysts have become substantially completely sulfided by contact with a sulfur- and nitrogen-containing feed. It has now been found that the denitrogenation activity of the molybdenum-rich catalysts is still further improved if the catalyst, in its reduced or oxide form, is first contacted, under relatively mild conditions, with a non-coking sulfiding agent such as hydrogen sulfide, or a hydrogen sulfide-hydrogen mixture. After such a pre-sulfiding operation, the 15% $MoO_3$ catalyst which displayed a relative activity of 1.37 without pre-sulfiding, will then display an activity of about 1.6 to 2.5, relative to the feed-sulfided 9% $MoO_3$ catalyst. The activity of the 9% $MoO_3$ catalyst is also improved by pre-sulfiding, to a relative activity of about 1.28, but this still does not begin to match the activity of the pre-sulfided 15% $MoO_3$ catalyst.

(The "activity" figures mentioned herein are derived from the equation:

$$\text{Log } X_0 - \text{log } X_p = \frac{L_x C_x}{LHSV}$$

where $X_0$ is the feed concentration of the component X which is being converted (such as basic nitrogen), $X_p$ is its concentration in the product, $L_x$ is the activity with respect to the conversion of the X component, $C_x$ is a constant depending upon reaction conditions and feed, and LHSV is the liquid hourly space velocity.)

The activity of the Co—Mo catalysts for desulfurization is also somewhat improved by raising the $MoO_3$ content from 9% to 15%, but to a much lesser degree than the denitrogenation activity. However, a substantial improvement in desulfurization activity results from the pre-sulfiding operation. For example, if the desulfurization activity of a feed-sulfided 9% $MoO_3$, 4% CoO catalyst be taken as 1.0, then the relative activity of the pre-sulfided, 15% $MoO_3$ catalyst is about 1.54.

It will be apparent therefore that the broad object of this invention is to provide more active denitrogenation catalysts. A more specific object is to provide a hydrorefining process which is capable of reducing the nitrogen content of hydrocarbons to a suitably low figure such that the product can be subjected to hydroforming over platinum-alumina catalysts without poisoning the platinum, or to hydrocracking in contact with an acidic hydrocracking catalyst. Still another object is to provide hydrorefining catalysts which will effect a practical degree of denitrogenation at temperatures sufficiently low to avoid rapid catalyst deactivation, and at economical space velocities. Other objects will be apparent from the description which follows.

In catalytic hydrorefining processes, attention has in the past been devoted mainly to reducing the sulfur content of hydrocarbons. Desulfurization is necessary in order to improve lead-susceptibility, and to provide a clean-burning fuel which does not produce large amounts of sulfur dioxide in the atmosphere, and/or corrosion in the engine and exhaust system. Sulfur compounds have also been suspected of playing a part in gum formation in gasolines, and certainly they are bad from the standpoint of odor. Catalytic hydrorefining has been very successful in reducing sulfur in hydrocarbons to practically zero.

However, although it has been recognized that hydrorefining effects a reduction in nitrogen compounds, it is unusual to find more than about 50% to 75% of the nitrogen compounds removed in conventional hydrorefining. This problem has become more acute in recent years because of several developments. Firstly, more and more gasoline stocks are being subjected to reforming using platinum-alumina catalysts. These platinum-alumina catalysts have been found to be even more sensitive to poisoning by organic nitrogen compounds than by sulfur compounds. Secondly, much current interest is developing in the catalytic hydrocracking of gas oils to produce gasoline, and hydrocracking catalysts are notoriously sensitive to basic nitrogen compounds. Thirdly, the depletion of the more desirable oil reserves in this country has resulted in increased utilization and refining of the less desirable crude oils which contain large amounts of sulfur and nitrogen. All of these factors, coupled with the prospective advent of utilizing crude shale oil (which usually contains even larger amounts of nitrogen compounds), have brought to a focus the need for a more efficient denitrogenation process.

The difficulty involved in obtaining adequate denitrogenation is aptly illustrated in attached FIGURE 1. Curve A of this figure represents data obtained in the hydrorefining of a coker naphtha boiling from 200° to 420° F., having an API gravity of 46.8, and initially containing 146 parts per million of basic nitrogen and about 1% sulfur. This feedstock was contacted with a conventional Co—Mo hydrorefining catalyst containing about 9.5% $MoO_3$ and 3% CoO at temperatures designated in FIGURE 1, and under otherwise similar conditions, i.e., pressure 600 p.s.i.g., liquid hourly space velocity (LHSV) 8.0 and 3,000 s.c.f. of hydrogen per barrel of feed. It will be noted from curve A that at a temperature of 675° F., only 58% of the nitrogen was removed, and that a temperature of 775° F. was required to remove 75.6% of the nitrogen. Of course, these results could be improved by operating at a lower space velocity, but this requires a large volume of catalyst and large reactors for the same feed throughput.

While the above data indicates that adequate denitrogenation might be obtained at very high temperatures, it would be desirable to use lower temperatures, in that high temperatures result both in a more rapid decline of catalyst activity by reason of the increased rate of coke formation, and lower liquid yields due to cracking. The molybdenum-enriched, pre-sulfided catalysts of this invention will effect the same denitrogenation as a conventional hydrorefining catalyst at a much lower temperature than is required for the conventional catalyst. For example, a typical pre-sulfided catalyst of this invention, having a molybdenum content corresponding to 14.2% $MoO_3$, can be used at temperatures 20–50° F. lower than the catalyst on which the data in curve A, FIGURE 1, is based, to obtain the same denitrogenation. Under the same hydrorefining conditions, the denitrogenation effected by this catalyst is represented by curve B in FIGURE 1. The substantially improved results obtainable at low temperatures are readily apparent.

The practical utility of my new catalysts becomes most apparent in fixed-bed operations. The principal and much sought after goal in these fixed-bed operations is to prolong the run lengths between catalyst regenerations. Where regeneration is required every few days, it is generally necessary to provide two swing reactors with double the amount of catalyst which is required for one reactor, so that one reactor will be on-stream while the other is being regenerated. Where the catalyst maintains its activity for several weeks, it is generally more economical to shut the plant down for regeneration than to provide a stand-by reactor. But, in any case, each regeneration is an expensive operation, and results in some irreversible damage to the catalyst. Hence, to achieve maximum total catalyst life and to minimize operational expenses, it is mandatory to achieve the maximum run length between regenerations.

Since a fresh catalyst or a freshly regenerated catalyst displays maximum activity, and since relatively constant conversion and throughput are desired in commercial operations, it is the normal practice to start a run at a relatively low temperature, and as the catalyst becomes less active, to raise the temperature periodically so as to maintain the desired conversion. This procedure is continued until a terminal temperature is reached at which the rate of catalyst deactivation becomes exponential as a result of the accelerated deposition of carbonaceous deposits. The range between the initial and terminal temperatures may be from about 25° to 300° F. or more. In hydrorefining operations, the terminal temperature for light stocks such as gasoline is ordinarily about 775°–850° F.; for heavier stocks such as gas oils about 750°–775° F.; and proportionately for other stocks depending on their end-boiling-points and general refractoriness. It is thus evident that for a given conversion, throughput and feedstock, the run length will be determined by the permissible starting temperature. If, say, a given conversion can be maintained with a 0.5° F. temperature rise per day, and the terminal temperature is 800° F., a 300 day run length can be achieved if the desired conversion can be initiated with the fresh catalyst at 650° F., but the run length will be only 100 days if the starting temperature must be 750° F.

Thus, the importance of catalyst activity at low temperatures becomes clearly apparent in such operations. It is contemplated herein to commence the denitrogenation runs at space velocities of 0.5 to about 3.0, and temperatures between about 600° and 725° F. to obtain 85–100% nitrogen removal, and continue to a terminal temperature of about 775°–850° F., with at least half of the run being carried out at below about 750° F. Pressures of about 400–2,000 p.s.i.g. may be utilized, and run lengths of at least about 60 days are entirely feasible, and usually up to 6 months or more. Such runs are not possible with the conventional non-pre-sulfided, low-molybdenum hydrorefining catalysts, except by resorting to uneconomically low space velocities in the range of about 0.1 to 0.4.

The new catalysts of this invention contain between about 7.5% and 12% of Mo, and 0.7 to 4% of Co. It is further preferred that the Mo content should lie within the range of about 8.3 to 10% by weight (corresponding to about 12.5 to 15% $MoO_3$), and that the Co/Mo atomic ratio should fall within the range of about 0.2 to 0.6.

Suitable adsorbent carriers for use herein are those consisting predominantly of activated alumina, and especially activated aluminas containing a minor proportion, e.g., 3–20% by weight of coprecipitated silica gel. Such coprecipitated carriers may be prepared, for example, by passing carbon dioxide through an aqueous solution of sodium aluminate and sodium silicate. The coprecipitated gel is then drained, washed, dried and compressed into pellets which are then calcined at, e.g., 700°–1,200° F., and may then be impregnated with appropriate aqueous solutions of soluble cobalt and molybdenum salts.

When the catalyst is prepared by impregnation, it is preferred to use two or more separate impregnations with intervening drying and/or calcining between impregnations. It is further preferred that the carrier be first impregnated with the molybdenum solution and then with the cobalt solution, since this order of impregnation is found to give a more active catalyst than the reverse order.

In some instances, it will be found that it is difficult to deposit in one impregnation the large amount of molybdenum required herein, due to the precipitation of insoluble molybdenum compounds from the concentrated solutions required. Hence, two separate impregnations with molybdenum solutions may be desirable. Where two molybdenum impregnation steps are employed, the preferred orders of impregnation are Mo—Mo—Co and Mo—Co—Mo. It has been found that the Co—Mo—Mo order of impregnation gives an inferior catalyst, but the other two orders of impregnation give catalysts of substantially equal activity, each being significantly higher than the Co—Mo—Mo order of impregnation. It will be understood that between each impregnation it is preferable to dry and/or calcine the catalyst.

While the impregnation method is greatly to be preferred herein, other methods may be employed, as for example, coprecipitation of both components on the carrier as described in U.S. Patent No. 2,369,432, or co-impregnation of both components on the carrier as described in U.S. Patent No. 2,486,361.

It is also contemplated that small amounts of chlorine or fluorine may be added to the catalyst to improve its denitrogenation activity. Amounts between about 0.1% and 5% by weight may be employed. The halogen may be incorporated into the catalyst by impregnation, for example, using dilute hydrofluoric acid solutions or fluosilicic acid, or preferably by adding an organic fluorine compound to the feed, as described in my copending application, Serial No. 46,082, filed July 29, 1960.

Following the incorporation of cobalt and molybdenum into the support, the catalyst is normally calcined at e.g., 500°–1,200° F. for 1 to 20 hours to convert the salts to oxide forms. The calcined catalyst is then in condition for the presulfiding step, which normally consists in flowing a stream of hydrogen containing 1–50% by volume of $H_2S$ over the catalyst at e.g., 0–800° F. for 0.5 to 12 hours, or preferably until the catalyst is substantially completely sulfided as evidenced by the appearance of $H_2S$ in the off-gases. Instead of hydrogen sulfide, other non-coking sulfiding agents may be employed, such as carbon disulfide, lower mercaptans and the like. It is normally preferable to initiate the sulfiding at suitably low temperatures, e.g., 70°–200° F., and/or low $H_2S$ concentrations, e.g., 0.5–5%, so as to avoid local overheating from the exothermic sulfiding reaction. It is also preferable to terminate the sulfiding at relatively high temperatures, e.g., about 500°–800° F., in order to complete the reaction and to desorb water formed during the reaction. Low pressures, e.g., atmospheric, are also preferred for this reason.

According to one modification, the calcined catalyst may first be subjected to a hydrogen reduction treatment at 400°–750° F. to reduce the metal oxides at least partly to free metals. This reduces the exothermicity of the succeeding sulfiding operation, which may be initiated by simply bleeding into the hydrogen stream the desired proportion of $H_2S$ or other sulfiding agent.

The catalysts of this invention are preferably employed in the form of granules, extrudates, pellets, lumps or the like, ranging in size from about 1/16″ to about 1/2″ in average diameter. These pellets are preferably disposed in a stationary bed within a suitable reactor capable of withstanding high pressures, as for example, a cylindrical steel column. The feedstock is preheated to the desired temperature, admixed with hydrogen and passed through the catalyst bed at the desired temperature and pressure. The products are recovered in the conventional manner, involving condensation and separation of hydrogen-rich recycle gas, followed by removal of low boiling hydrocarbons.

Feedstocks which may be treated herein include in general any mineral oil stock boiling between about 100° and 1,000° F., and containing generally between about 0.001% and 10% by weight of organically combined nitrogen. Specific examples of suitable stocks include crude oils, reduced crude oils, deasphalted reduced crude oils, light gas oils, heavy gas oils, kerosene, solvent naphthas, fuel oils, diesel fuels, jet fuels, heavy naphthas, light naphthas, cycle oils from cracking operations, coker distillates, cracked gasolines, etc. These stocks may be derived from petroleum, shale, tar sands, or any other similar natural deposits. Stocks containing more than about 0.1% by weight of organic nitrogen, and up to about 3% thereof, are especially amenable to treatment herein.

Suitable denitrogenation conditions broadly contemplated for use herein are as follows:

TABLE 1

|  | Operative | Preferred |
|---|---|---|
| Temperature, ° F. | 500–950 | 600–875 |
| Pressure, p.s.i.g. | 100–5,000 | 500–3,000 |
| LHSV | 0.5–20 | 1–5 |
| $H_2$/oil, SCF/B | 200–10,000 | 500–5,000 |

After the catalyst has become deactivated to an undesirable extent during hydrorefining, it may be regenerated by controlling combustion to burn off carbonaceous deposits. The regeneration is normally conducted at temperatures of about 800°–1,200° F., using dilute oxygen-containing gases as the oxidizing agent, e.g., flue gas containing about 0.5% to 5% by volume of oxygen. Following the oxidation, which normally converts the catalyst substantially to the oxide form, it is necessary to again pre-sulfide the catalyst under non-coking conditions, as in the case of the fresh catalyst. Here again, an optional hydrogen reduction step may precede the sulfiding step.

The specific advantages and utility of the invention will be more apparent from the following examples, which should not however be construed as limiting in scope. Examples I–III illustrate the improved activity resulting from increasing the $MoO_3$ content of the catalysts to the 12.5–18% range, and the further, but relatively small, increase in activity which occurs when the catalysts, initially in oxide form, become sulfided by the feed under hydrorefining conditions. Examples IV and V illustrate the substantial further improvement in activity brought about by pre-sulfiding the catalysts.

EXAMPLE I

In this example two catalysts of different $MoO_3$ content are compared. Catalyst A was a conventional hydrorefining catalyst containing 9.5% $MoO_3$ and 3.0% of cobalt oxide impregnated on a coprecipitated alumina-silica gel carrier containing 5% $SiO_2$. Catalyst B was similarly prepared on the same carrier, but with a double impregnation of molybdenum so that the final catalyst contained 13.8% $MoO_3$ and 3.3% CoO.

Each of the foregoing catalysts was then tested in parallel runs for desulfurization and denitrogenation activity, using as feed a blend of coker distillate and cracked naphthas boiling between about 205° and 427° F. and having an API gravity of 41.8°. The sulfur content was 1.52% and the basic nitrogen content was 143 parts per million. The feed was treated at 675° F. average bed temperature, 600 p.s.i.g., 8 LHSV and 3,000 s.c.f. of hydrogen per barrel of feed. It should be noted that these conditions were relatively mild so as to bring into sharper focus any differences in activity between the catalysts. After each catalyst had been onstream for about 4.5 hours (the catalyst then being in an incompletely sulfided state), the 4.5–13.5 hour product was collected and analyzed for sulfur and nitrogen. The results were as follows:

Table 1

| Product analyses | Catalyst | |
|---|---|---|
|  | A (9.5% $MoO_3$, 3% CoO) | B (13.8% $MoO_3$, 3.3% CoO) |
| Sulfur, weight percent | 0.047 (97% removal) | 0.024 (98%.5 removal) |
| Basic nitrogen, p.p.m. | 43 (70% removal) | 28 (80.5% removal) |

It will be observed that catalyst B is substantially more active for denitrogenation than catalyst A.

Each of the foregoing catalysts was maintained onstream for 3 days under the same conditions. At the end of the 3-day period (the catalysts then being substantially completely sulfided), product samples were again collected and analyzed for basic nitrogen with the following results:

Table 2

| Product analyses | Catalyst | |
|---|---|---|
|  | A | B |
| Basic nitrogen, p.p.m. | 33 (77% removal) | 16 (89% removal) |

It will be observed that each of the catalysts improved in activity after 3 days of use as a result of feed-sulfiding, but catalyst B increased relatively more in activity than did catalyst A.

EXAMPLE II

Two additional molybdenum-rich catalysts were prepared as follows:

Catalyst C was prepared by impregnating the alumina-silica carrier of Example I first with a concentrated ammonium molybdate solution and then with an aqueous cobalt nitrate solution. The catalyst was dried between impregnations and was finally calcined for 2 hours at 1,112° F. The final catalyst contained 3.1% CoO and 13.5% $MoO_3$, the Co/Mo atomic ratio being 0.45.

Catalyst D was prepared first by impregnating with aqueous ammonium molybdate, then with cobalt nitrate solution, and then again with ammonium molybdate solution. The carrier, and techniques of preparation were otherwise the same as for catalyst C. The final catalyst contained 16.7% $MoO_3$ and 2.9% CoO, the Co/Mo atomic ratio being 0.33.

Catalysts C and D were then compared with conventoinal catalyst A for hydrorefining activity using a naphtha feedstock substantially similar to that used in Example I. The results were as follows:

Table 3

|  | A | C | D |
|---|---|---|---|
| Catalyst: |  |  |  |
| Order of impregnation. | Mo—Co | Mo—Co | Mo—Co—Mo. |
| Analysis | 9.5% $MoO_3$, 3% CoO | 13.5% $MoO_3$, 3.1% CoO | 16.7% $MoO_3$, 2.9% CoO. |
| Product analyses: |  |  |  |
| Sulfur, weight percent. | 0.012 | 0.009 | 0.012. |
| Percent removal | 99.1 | 99.3 | 99.1. |
| Basic nitrogen: |  |  |  |
| P.p.m | 25 | 18 | 13. |
| Percent removal | 82.2 | 87.1 | 90.7. |

The substantial improvement in denitrogenation activity shown by catalysts C and D is readily apparent. The run employing catalyst D shows in addition that the Mo—Co—Mo order of impregnation products a catalyst at least equal in activity to catalyst C prepared by the Mo—Co order of impregnation.

EXAMPLE III

This example demonstrates the superior denitrogenation activity of the present catalysts with respect to a gas oil feedstock. This feed was a commercial catalytic cracking charge stock boiling between 380° and 760° F., having an API gravity of 24.8°, and containing 2.4 weight percent sulfur and 0.31% nitrogen. Reaction conditions were: average bed temperature, 775° F.; pressure 700 p.s.i.g.; LHSV 3.0; hydrogen 3,500 s.c.f./bbl. The catalyst (E) contained 15.5% $MoO_3$ and 3.0% CoO, alternately impregnated on the $Al_2O_3$—$SiO_2$ gel carrier of Example I in the Mo—Co order. This catalyst was compared with catalyst A, with the following results:

Table 4

| Product analyses | Catalyst | |
|---|---|---|
|  | A (9.5% $MoO_3$, 3% CoO) | E (15.5% $MoO_3$, 3% CoO) |
| Nitrogen, weight percent | 0.185 | 0.159 |
| Percent removal | 40.3 | 48.6 |

EXAMPLE IV

In this example, conventional catalyst A is compared with a molybdenum-rich catalyst F of this invention, each catalyst being compared in partially feed-sulfided, completely feed-sulfided, and completely pre-sulfided forms. Catalyst F originally contained about 3% CoO and 15% $MoO_3$, impregnated on the 95% $Al_2O_3$, 5% $SiO_2$ carrier of Example I. The pre-sulfiding of the respective catalysts was carried out by contacting the calcined catalyst (⅛" pellets) with a stream of hydrogen containing 5% $H_2S$ by volume at temperatures rising gradually from 70° to 700° F., and then holding at 700° F. for one hour. The $H_2S$—$H_2$ mixture was passed over the catalyst at the rate of 500 standard volumes per volume of catalyst per hour.

The feedstock was a coker naptha boiling between 200–435° F., containing 1.1 weight-percent of sulfur, 142 parts per million of nitrogen, and having an API gravity of 46.6°. The hydrorefining conditions were the same as in Example I. The results were as follows:

Table 5

| Catalyst | Products | | | |
|---|---|---|---|---|
|  | Nitrogen content | | Sulfur content | |
|  | P.p.m. | Percent removal | Weight percent | Percent removal |
| A (9.5% $MoO_3$, 3% CoO): |  |  |  |  |
| Incompletely sulfided (13 hr. product) | 50 | 64.8 | 0.060 | 95.5 |
| Feed-pre-sulfided (2.2 day product) | 41 | 71.1 |  | >98 |
| Completely presulfided in absence of feed | 29 | 79.7 |  | >98 |
| F (15% $MoO_3$, 3% CoO): |  |  |  |  |
| Incompletely sulfided (13 hr. product) | 33 | 76.8 |  | >98 |
| Feed-pre-sulfided (2.2 day product) | 27 | 81.0 |  | >98 |
| Completely presulfided in absence of feed | 20 | 85.9 |  | >98 |

Figure 2:
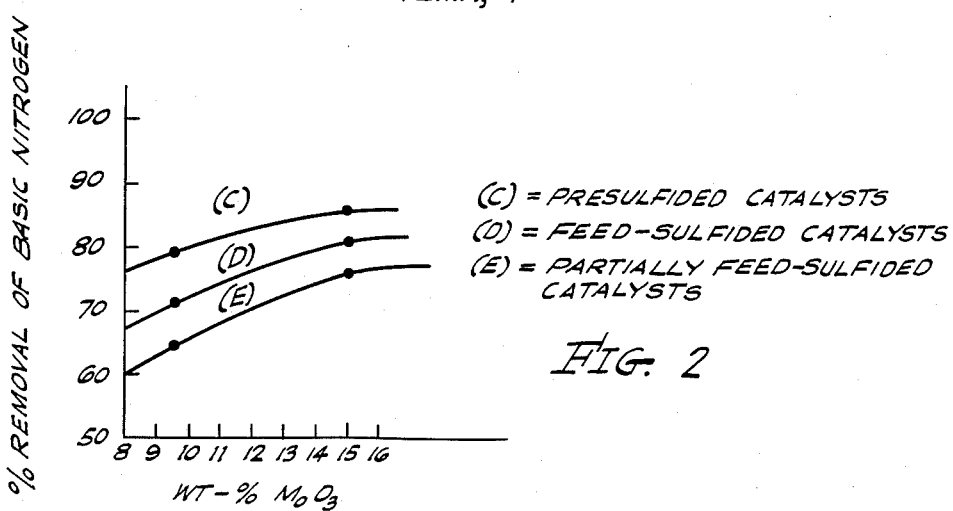

The marked improvement obtained by the combination of raising the $MoO_3$ content from 9.5% to 15% and pre-sulfiding is readily apparent. This data is illustrated graphically in FIGURE 2, from which the effect of each variable is clearly apparent. By using catalyst F at the same temperature (675° F.) and pressure (600 p.s.i.g.), but at a commercial space velocity of 2.0 instead of 8, the nitrogen content of the product is then less than 1 p.p.m., corresponding to almost 100% removal. This, then demonstrates that such a catalyst can be used commercially at initial temperatures below 700° F., and at economical space velocities, to remove 95–100% of the nitrogen in the feed. This conversion can be maintained by raising the temperature about 0.3–1° F., per day, resulting in permissible run lengths of at least about 125 days, and up to about 1 year or longer, without going above 800° F.

EXAMPLE V

To evaluate the results of various pre-sulfiding techniques, portions of a 14.5% $MoO_3$, 3% CoO catalyst, prepared by alternate impregnation of a 95% $Al_2O_3$, 5% $SiO_2$ carrier, were subjected to the pre-sulfiding techniques specified in Table 6, and then tested for denitrogenation activity under the conditions of Example I. The results were as follows:

Table 6

| Catalyst | Pre-sulfiding agent | Pre-sulfiding conditions | Activity for denitrogenation [1] |
|---|---|---|---|
| G-1 | Sour fuel gas [2] | 150° F., 4 hrs.; 10-65 p.s.i.g. | 1.07 |
| G-2 | ___do___ | 70-700° F., 1 hr.; atm. pressure | 0.94 |
| G-3 | ___do___ | 400° F., 6 hrs.; atm. pressure | 0.91 |
| G-4 | ___do___ | ___do [3]___ | 0.82 |
| G-5 | Sour recycle $H_2$ [4] | 90° F., 12 hrs.; 150 p.s.i.g. | 1.01 |
| G-6 | ___do___ | 400-700° F., 4 hrs.; 150 p.s.i.g. | 0.96 |

[1] Activity relative to catalyst F, Example IV.
[2] Contained 16% $H_2$, 3.5% $H_2S$, 78% $C_1$-$C_3$ hydrocarbons.
[3] This catalyst exposed to atmosphere after pre-sulfiding.
[4] Contained 78% $H_2$, 0.4% $H_2S$, 21% $C_1$-$C_3$ hydrocarbons.

This example demonstrates that the pre-sulfiding can be carried out under a variety of conditions, utilizing economical and readily available sources of hydrogen sulfide. The results obtained with catalyst G-4 demonstrate that the pre-sulfided catalyst should not be allowed to contact air or oxygen before it is placed on-stream.

When other feedstocks within the purview of this invention are substituted for the naptha feeds of this foregoing examples, a commensurate improvement in denitrogenation activity is found for the catalysts subjected to pre-sulfiding. Also, analogous improvements are noted under other reaction conditions than those of the examples. It is hence not intended that the invention should be restricted to the details of the examples, but only broadly as defined in the following claims.

I claim:
1. A process for hydrorefining a mineral oil feedstock containing organic nitrogen compounds to effect at least about 85% denitrogenation thereof, which comprises contacting said feedstock plus added hydrogen with a hydrorefining catalyst at an initial hydrorefining temperature between about 600° and 725° F., a space velocity between about 0.5 and 3.0 and a pressure between about 400 and 2,000 p.s.i.g., periodically raising the temperature of said contacting in order to maintain a substantially constant degree of denitrogenation, continuing said contacting at incrementally rising temperatures until a terminal temperature between about 775°-850° F. is reached, whereby a run length of at least about 60 days is obtained in which at least about 85% denitrogenation is maintained throughout, said catalyst comprising between about 0.7% and 4% by weight of cobalt and between about 8.3% and 10% by weight of molybdenum intimately distributed and supported upon a carrier which is essentially activated alumina, said catalyst having been prepared by alternate impregnation with separate aqueous solutions of ammonium molybdate and a soluble cobalt salt, and having been pre-sulfided prior to use in said hydrorefining process by contact with a reactive sulfiding agent under non-coking conditions, the Co/Mo atomic ratio in said catalyst being between about 0.2 and 0.6.

2. A process as defined in claim 1 wherein said carrier is coprecipitated alumina-silica gel containing between about 3% and 20% by weight of $SiO_2$.

3. A process as defined in claim 1 wherein at least half of said run length is carried out at below about 750° F.

References Cited in the file of this patent

UNITED STATES PATENTS

| | | |
|---|---|---|
| 2,790,751 | Gerald | Apr. 30, 1957 |
| 2,952,625 | Kelly et al. | Sept. 13, 1960 |
| 2,952,626 | Kelly et al. | Sept. 13, 1960 |